United States Patent
Billmaier (10) Patent No.: US 7,076,202 B1
(45) Date of Patent: Jul. 11, 2006

(54) SYSTEM AND METHOD FOR PROVIDING AN ELECTRONIC PROGRAM GUIDE OF LIVE AND CACHED RADIO PROGRAMS ACCESSIBLE TO A MOBILE DEVICE

(75) Inventor: James A. Billmaier, Woodinville, WA (US)

(73) Assignee: Digeo, Inc., Kirkland, WA (US)

( * ) Notice: Subject to any disclaimer, the term of this patent is extended or adjusted under 35 U.S.C. 154(b) by 1173 days.

(21) Appl. No.: 09/851,528

(22) Filed: May 8, 2001

Related U.S. Application Data (63) Continuation-in-part of application No. 09/789,175, filed on Feb. 20, 2001.

(51) Int. Cl.
*H04H 1/00* (2006.01)

(52) U.S. Cl. ............ 455/3.04; 455/66.1; 455/344

(58) Field of Classification Search ........... 455/3.01, 455/3.06, 3.02, 66.1, 74
See application file for complete search history.

(56) References Cited

U.S. PATENT DOCUMENTS

| | | | |
|---|---|---|---|
| 4,706,121 A | 11/1987 | Young | 358/142 |
| 5,045,947 A | 9/1991 | Beery | 358/192.1 |
| 5,282,028 A | 1/1994 | Johnson et al. | 358/86 |
| 5,353,121 A | 10/1994 | Young et al. | 348/563 |
| 5,406,558 A | 4/1995 | Rovira et al. | 370/77 |
| 5,479,266 A | 12/1995 | Young et al. | 358/335 |
| 5,479,268 A | 12/1995 | Young et al. | 358/335 |
| 5,532,754 A | 7/1996 | Young et al. | 348/569 |
| 5,550,576 A | 8/1996 | Klosterman | 348/6 |
| 5,564,073 A | 10/1996 | Takahisa | 455/66 |
| 5,585,866 A | 12/1996 | Miller et al. | 348/731 |
| 5,589,892 A | 12/1996 | Knee et al. | 348/731 |
| 5,629,733 A | 5/1997 | Youman et al. | 348/7 |
| 5,668,591 A | 9/1997 | Shintani | 348/12 |
| 5,727,060 A | 3/1998 | Young | 380/10 |
| 5,809,204 A | 9/1998 | Young et al. | 386/83 |
| 5,870,150 A | 2/1999 | Yuen | 348/553 |
| 5,886,746 A | 3/1999 | Yuen et al. | 348/564 |
| 5,900,868 A | 5/1999 | Duhault et al. | 345/327 |
| 5,940,073 A | 8/1999 | Klosterman et al. | 345/327 |
| 5,940,391 A | 8/1999 | Malkin et al. | 370/390 |
| 5,970,206 A | 10/1999 | Yuen et al. | 386/83 |
| 5,974,222 A | 10/1999 | Yuen et al. | 386/83 |
| 5,977,964 A * | 11/1999 | Williams et al. | 715/721 |
| 6,002,450 A | 12/1999 | Darbee et al. | 348/734 |

(Continued)

OTHER PUBLICATIONS

OmniRemote Software; Website http://www.pacificneotek.com/omnisw.htm ; pp. 1-2.

(Continued)

*Primary Examiner*—Tilahun Gesesse
(74) *Attorney, Agent, or Firm*—Kory D. Christensen; Stoel Rives LLP (57) ABSTRACT

An electronic program guide for the radio (radio EPG) depicts radio programs available via the Internet or analog transmission. The radio EPG displays the programming available for a plurality of radio stations and time slots. The radio EPG is interactive in that a user may select a radio program for immediate playback or future recording. Radio programs are continuously received and cached by the Internet-enabled television system such that a user may be able to select and listen to an earlier-broadcast radio program listed in the radio EPG. The EPG is broadcast using a wireless technology so that mobile devices such as cellular phones, webpads, personal desktop assistants (PDA's), personal stereos, car stereos, and laptop computers with wireless network connections can receive and display the EPG.

58 Claims, 5 Drawing Sheets

U.S. PATENT DOCUMENTS

| | | | |
|---|---|---|---|
| 6,014,184 A | 1/2000 | Knee et al. | 348/731 |
| 6,040,829 A | 3/2000 | Croy et al. | 345/327 |
| 6,088,455 A | 7/2000 | Logan et al. | 380/280 |
| 6,130,726 A | 10/2000 | Darbee et al. | 348/734 |
| 6,169,543 B1 * | 1/2001 | Wehmeyer | 725/47 |
| 6,177,931 B1 | 1/2001 | Alexander et al. | 345/327 |
| 6,233,389 B1 | 5/2001 | Barton et al. | 386/46 |
| 6,434,621 B1 | 8/2002 | Pezzillo et al. | 709/231 |
| 6,658,231 B1 * | 12/2003 | Nakatsuyama | 455/3.06 |
| 6,721,403 B1 | 4/2004 | Mandalia | 379/101.01 |
| 6,928,262 B1 * | 8/2005 | Kanemitsu | 455/3.06 |
| 6,944,430 B1 * | 9/2005 | Berstis | 455/186.1 |

OTHER PUBLICATIONS

ComputerLetter; Business Issues in Technology, vol. 17, No. 5, Feb. 5, 2001; pp. 1-8.

RadioSpy; The Net Radio Resource; pp. 1-2, 1 and 1-4.

Office Action mailed Dec. 3, 2004. U.S. Appl. No. 09/789,175; filed Feb. 20, 2001.

Office Action mailed Jul. 28, 2005. U.S. Appl. No. 09/789,175; filed Feb. 20, 2001.

* cited by examiner

SYSTEM AND METHOD FOR PROVIDING AN ELECTRONIC PROGRAM GUIDE OF LIVE AND CACHED RADIO PROGRAMS ACCESSIBLE TO A MOBILE DEVICE

RELATED APPLICATION

This application is a continuation-in-part of U.S. patent application Ser. No. 09/789,175, filed Feb. 20, 2001, for "System and Method for Delivering Radio Programs and Related Schedule Information," with inventor James A. Billmaier, which is hereby incorporated by reference.

BACKGROUND

1. Field of the Invention

The present invention relates generally to electronic entertainment systems and methods. More specifically, the present invention relates to a system and method for delivering radio programs and related schedule information using a mobile device, such as a cellular phone, personal stereo, car stereo, webpad, personal desktop assistant (PDA), or laptop computer.

2. Description of Related Background Art

For many years, radio broadcasting has been an important medium for information delivery and entertainment. Each day, millions of people listen to a wide variety of radio programs, including music, news, sporting events, talk shows, and the like. In general, each locality has between 20 and 40 radio stations in the AM (amplitude modulated) and FM (frequency modulated) bands, providing a diversity of listening options.

Today, radio programs are being broadcast via the Internet. Radio signals are digitized, packetized, and transmitted to a receiver's computer or Internet-enabled television using standard protocols such as TCP/IP (transmission control protocol/Internet protocol). Various software programs are available for receiving and playing radio signals transmitted via the Internet, such as RealPlayer Plus®, available from RealNetworks, Inc. of Seattle, Wash.

Advantageously, Internet-based radio transmissions are not geographically limited. Thus, a local radio station in New York City may be received via the Internet at a user's home in Seattle or anywhere else in the world. It is now possible to choose from radio broadcasts from thousands of radio stations around the world via the Internet medium.

Unfortunately, the great proliferation of available Internet-based radio stations can be more than a little confusing, and possibly somewhat daunting, for many listeners. Many people do not listen to interesting programming simply because they are not aware of it. Currently, radio program listings for multiple stations are not being stored in any centralized and easily-accessible medium.

Moreover, once a listener has missed a desired program, there is typically no way for the listener to hear it, aside from making a special request to a radio station. In order to record a program, a user must typically set up and use special equipment or software, the operation of which is often too complex for the average user.

Known methods of informing users of available radio programming schedules have proven to be deficient in a number of areas. Written programming guides, for example, require significant lead time to print and distribute. Consequently, programming changes that occur after printing are not reflected in the written programming guides. Additionally, a viewer must obtain a new programming guide periodically (e.g., weekly) in order to keep the written information current.

Many radio stations periodically announce what radio programs will be airing in the near future. However, if a person does not happen to be listening at the time of the announcement, he or she will not receive the schedule information. Additionally, the schedule information provided by such an announcement is typically applicable to only a small set of programs airing on the particular radio station.

In the case of packetized transmissions, i.e., those transmitted over a network such as the Internet, programming information available to listeners is similarly deficient. A few Internet-accessible radio stations provide information concerning the general content of radio broadcasts, e.g., "Classical Music," "Family Values Talk Radio," etc. Occasionally, a radio station may provide an indication of a specific artist, title, etc., for a single song being currently broadcast by the station. However, information concerning future broadcasts is generally not available. Additionally, there is no single resource for radio program schedule information pertaining to multiple Internet-accessible radio stations for past, present, and future radio programs.

Accordingly, there is a need for a system and method for providing radio program schedule information to a listener that overcome the limitations of the prior art. Such a system and method should preferably provide information related to multiple stations for multiple time slots. Additionally, the system and method should preferably enable a user to easily select past, present, and future radio programs for recording and/or playback.

Many people choose to listen to the radio away from their homes. In general, the most profitable time for radio is believed to be the morning and late afternoon hours during the commute to and from work. As such, the system of the present invention should not be limited to fixed-location devices, such as home stereo systems and televisions. Indeed, there is a need for a mobile device that is capable of receiving radio programs and related schedule information.

BRIEF DESCRIPTION OF THE DRAWINGS

Non-exhaustive embodiments of the invention are described with reference to the figures, in which.

DETAILED DESCRIPTION OF THE INVENTION

The present invention solves the foregoing problems and disadvantages by providing a system and method for delivering radio programs and related schedule information using a mobile device. A database of radio program schedule information is maintained for a plurality of Internet-accessible radio stations. A mobile device, such as a digital car stereo, digital personal stereo, personal desktop assistant (PDA), cellular phone, laptop computer, or webpad retrieves the schedule information from the database. The schedule information may be routed through a broadband communication network to reach wireless broadcast facilities. Each wireless transmission apparatus may be coupled to one or more local transmitters, from which the schedule information can be transmitted in the form of a cellular or other transmissions to the mobile device.

The mobile device receives the schedule information and generates therefrom an electronic program guide for radio ("radio EPG"). In one embodiment, the radio EPG graphically illustrates the programming for multiple radio stations and time slots in a grid format.

According to selected embodiments, the radio EPG is interactive in that a user may select a radio program therefrom. If the selected radio program is being currently broadcast, the mobile device may receive the radio program from an Internet-accessible radio station and may simultaneously play it for the user. If the radio program is to be broadcast in the future, the mobile device may set a recording task to record the radio program when it is subsequently broadcast by the radio station. If the radio program was broadcast in the past, the mobile device may determine whether the radio program was previously cached in response, for example, to a recording task, a user selection, or an ongoing program of caching radio programs in anticipation of user demand. If the radio program was cached, the mobile device may play the radio program for the user in response to the selection.

Thus, the present invention provides a centralized resource by which the user may obtain schedule information for a plurality of Internet-accessible radio stations for multiple time slots, without access to a wired network connection. The present invention also provides a mechanism for easy selection of a radio program for listening or recording.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
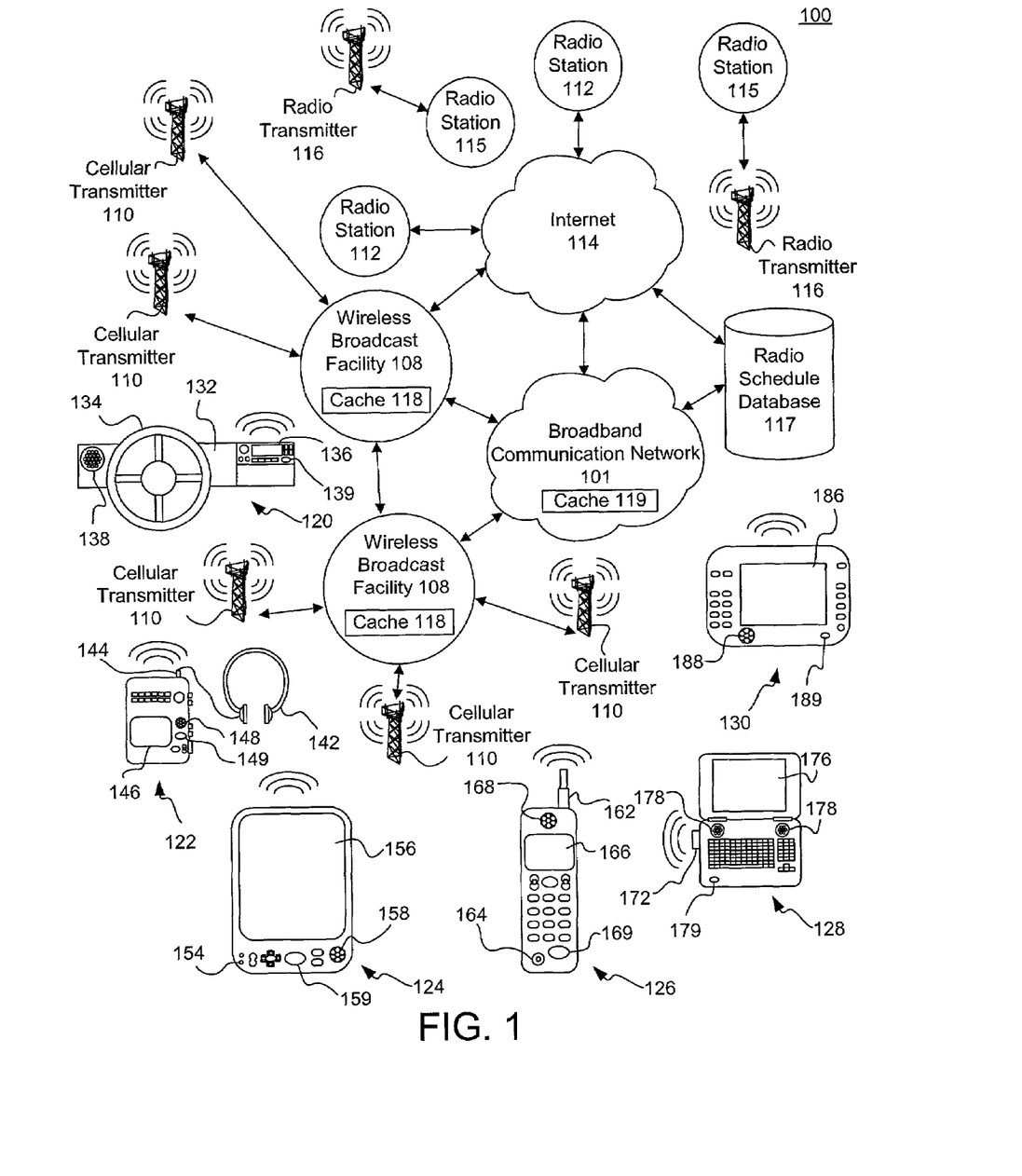
FIG. 1 is a block diagram of a system for delivering radio and television programs and related schedule information to a plurality of mobile devices.

Referring now to FIG. 1, there is shown a system 100 for delivering media programs (such as television and radio programs) to a plurality of users. In one implementation, the system 100 includes a broadband communication network 101, such as a cable network. However, other networks are contemplated, one particular example of which is a satellite network.

In one configuration, the system 100 includes a plurality of wireless broadcast facilities 108 coupled directly or indirectly to the broadband communication network 101. The wireless broadcast facilities 108 may be local installations in which transmissions from the broadband communication network 101 are received, stored, and/or formatted for wireless transmission. In one configuration, a wireless transmission apparatus also functions as a Central Office (CO) in the wireless telephone industry, routing telephonic communication and other data to customers of a wireless service.

Each of the wireless broadcast facilities 108 is connected to one or more transmitters 110, which are preferably capable of transmitting digital and/or analog information through a wireless method. According to one embodiment, the transmitters 110 may include cellular transmitters, which may be part of a wireless telephone network. Alternatively, the wireless transmitters may be 802.11b transmitters or other standard transmission devices.

The network 101 is preferably coupled to one or more radio stations 112 via the Internet 114. The Internet 114 is a "network of networks" and is well known to those skilled in the art. Communication over the Internet 114 is accomplished using standard protocols, such as TCP/IP (Transmission Control Protocol/Internet Protocol) and the like.

The radio stations 112 may be "internet only" radio stations, i.e., the stations do not use conventional electromagnetic wireless broadcasting techniques. Alternatively, conventional, analog radio stations 115 may be used.

In one configuration, a radio schedule database 117 is coupled to one or both of the broadband communication network 101 and the Internet 114. The radio schedule database 117 preferably maintains schedule information for past, present, and future radio programs broadcast by a plurality of radio stations 112. Throughout the following disclosure, the term "broadcast" is not limited to electromagnetic transmissions, but contemplates packetized transmissions using a network, such as the Internet 114. The radio schedule database 117 may be implemented using any conventional relational or hierarchical database management system (DBMS) or the like.

In one implementation, the radio schedule database 117 receives radio program schedule information directly from the radio stations 112 via the Internet 114 using, for example, the hypertext transfer protocol (HTTP) or the file transfer protocol (FTP). In such an embodiment, updates of the database may be fully automated. However, in other embodiments, the radio program schedule information may be obtained from disks, CD-ROMS, or tapes, or may even be manually entered If desired, each of the wireless broadcast facilities 108 may have a cache 118, in which radio programs and/or radio program schedule information can be stored for future retrieval. The caches 118 may take the form of hard disk drives or the like configured to record a digital audio streams or other types of data. In the alternative, or in addition, to the caches 118, the broadband communication network 101 may include a cache 119 in a central location for storing radio programs and/or radio program schedule information.

In one embodiment, the cellular transmitters 110 transmit radio program schedule information to a plurality of mobile devices 120, 122, 124, 126, 128, 130. Preferably, the broadcast provided by the cellular transmitters 110 is digital. Some or all of the mobile devices 120, 122, 124, 126, 128, 130 may also be configured to receive and play a digital radio broadcast transmitted by the radio stations 112 via the cellular transmitters 110, or by the conventional radio stations 115 via the radio transmitters 116.

Of course, transmissions need not be directly to the mobile devices 120, 122, 124, 126, 128, 130. For example, a transmission may be made to an intermediate device (using wired or wireless methods) and then transmitted to a mobile device using, for example, IrDA (Infrared Data Association) or other wireless technique.

The mobile devices 120, 122, 124, 126, 128, 130 may include, for example, a car stereo 120, a personal stereo 122, a personal desktop assistant (PDA) 124, a cellular phone 126, a laptop computer 128, a webpad 130, or other similar device.

The car stereo 120, for example, may be mounted in a dash board 132 of a vehicle (not shown), near a steering wheel 134. Preferably, the car stereo 120 has a screen 136 on which radio program information can be displayed. A speaker 138 plays radio programming, either received digitally from one of the cellular transmitters 110, or received in analog fashion from one of the radio transmitters 116. A specifically designated "Radio EPG" button 139 may be positioned near the screen 136, so that a user can obtain radio program schedule information with one simple operation. The car stereo 120 may also include compact disc, cassette, or MP3 player, or the like (not shown).

The personal stereo 122 may have a set of headphones 142 or the like connected to the main body of the personal stereo 122 through the use of a headphone jack 144. A screen 146 provides radio program information for the user. The personal stereo 122 may also have a speaker 148 that can be selectively turned on for use in place of the headphones 142. A specifically designated "Radio EPG" button 149 may also be provided. A cassette, CD, and/or MP3 player or the like (not shown) may also be included.

The PDA 124 may be configured to provide name and address storage, scheduling, or the like for the user. Furthermore, the PDA 124 may include a headphone jack 154 for coupling the PDA 124 to a set of headphones 142 for private listening. A screen 156 displays radio program information for the user, as well as any other type of information stored by the PDA 124. A speaker 158 may also be included to provide radio program playback or other sounds useful for the operation of the PDA 124. A specifically designated "Radio EPG" button 159 may also be provided.

The cellular phone 126 may have an antenna 162 for receiving cellular broadcasts at an increased range. A microphone 164 captures the user's voice for transmission. A screen 166 displays the radio program information and other information pertinent to the operation of the cellular phone 126, such as address listings, calling histories, and the like. A speaker 168 provides an audible output so that the cellular phone 126 can be used for telephonic communication with another person and, if desired, to receive and play radio broadcasts from the cellular transmitter 110 and the radio transmitter 116. A specifically designated "Radio EPG" button 169 may also be provided.

The laptop computer 128 preferably includes a wireless network interface card (NIC), such as a cellular modem. A screen 176 serves as a computer monitor for the user, and is also configured to display the radio program schedule information. Speakers 178 provide audio output in conjunction with the operation of the laptop computer 128, and may also be used to play radio programs received from the cellular transmitter 110 and/or the radio transmitter 116. A specifically designated "Radio EPG" button 179 may also be provided to activate the radio EPG.

The webpad 130 may be configured to provide wireless access to the Internet 114. A screen 186 selectively displays radio program schedule information. A speaker 188 provides audio output in conjunction with the operation of the webpad 130, and may also be used to play radio programs received from the cellular transmitter 110 and/or the radio transmitter 116. A specifically designated "Radio EPG" button 189 may also be provided to activate the radio EPG.

Although the mobile devices 120, 122, 124, 126, 128, 130 are somewhat similar in appearance to known devices, the mobile devices 120, 122, 124, 126, 128, 130 have been specifically designed to receive and display a radio EPG for the user, and in certain embodiments, to control caching or playback at the user's request. One possible configuration for an exemplary mobile device will be shown and described subsequently in connection with FIG. 2. Furthermore, an example of hardware architecture that may be utilized for the exemplary mobile device will be shown and described in connection with FIG. 3.

Figure 2:
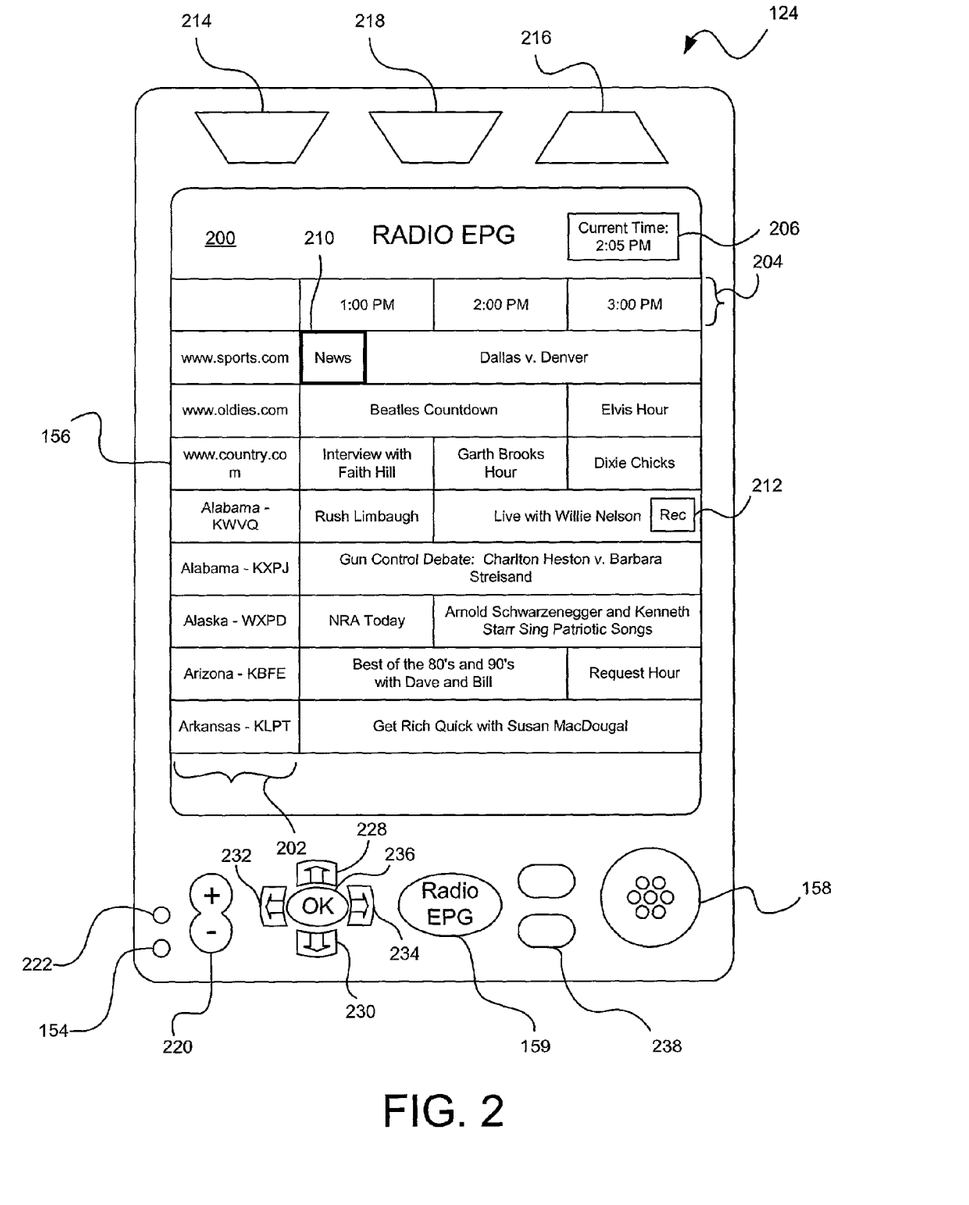
FIG. 2 is an illustration of an electronic program guide displayed on an exemplary mobile device.

Referring now to FIG. 2, an enlarged view of the PDA 124 of FIG. 1 is shown to provide an example of the operation of one of the mobile devices 120, 122, 124, 126, 128, 130 of the present invention. Those of skill in the art will recognize that the disclosure provided below is also applicable to other mobile devices 120, 122, 126, 128, 130, as well as to mobile devices not depicted in FIG. 1.

An exemplary radio EPG 200 is depicted on the screen 156 of the PDA 124. The screen may be of any known type, but is preferably of a type that requires a minimal amount of power and space, such as a liquid crystal display (LCD). The screen 156 may be a color or black-and-white display.

The radio EPG 200 preferably lists the radio programming available for a plurality of radio stations 112, 115 and a plurality of time slots. Additionally, according to selected embodiments, the radio EPG 200 preferably provides a mechanism by which a user can select a desired program for immediate playback or future recording.

The radio EPG 200 may be displayed on the screen 156 in response to a user pressing the "Radio EPG" button 159. Alternatively, the radio EPG 200 may be displayed in response to selection of a menu item or control (not shown) displayed on the screen 156.

As depicted, the radio EPG 200 may be embodied as a grid, with rows corresponding to radio stations 112, 115 and columns corresponding to time slots. In an alternative embodiment, the rows may correspond to time slots and the columns may correspond to radio stations 112, 115. Each element of the grid preferably corresponds to a radio program. A radio program may comprise an individual song, a music "set," a program by a particular DJ, a radio talk show, a sporting event, etc.

In certain embodiments, the EPG 200 may include information pertaining to a single radio station 112, 115 for a plurality of time slots. Alternatively, the EPG 200 may include information pertaining to a single time slot for a plurality of radio stations 112, 115.

The elements need not be equal in length because the radio programs are not equal in length. Additionally, the elements need not be precisely aligned with the time slots columns because the radio programs may not begin on the hour, or on the half hour, but may begin and end at odd times. Thus, as illustrated, the elements may be irregularly shaped.

In the depicted embodiment, the first element 202 of each row (or column) of the radio EPG 200 identifies the specific radio station 112, 115 associated with that row (or column). The identification of a conventional, analog broadcast radio station 115 may include, for instance, an indication of the state and/or city in which the radio station 115 is located (e.g., Alabama), the "call" letters of the radio station 112 (e.g., KXPJ), an indication of the overall genre of the radio station 115 (e.g., rock or country), or the like. In the case of an Internet-only radio station 112, a domain name or URL may be provided (e.g., www.oldies.com). The elements 202 form a column (or row) which may be arranged in any suitable order, such as alphabetically by state, alphabetically by city, in order of popularity, etc.

Likewise, in the depicted embodiment, the first element 204 of each column (or row) may identify a time slot. In various embodiments, the time slot may correspond to a different period of time, e.g. an hour, a half hour, a quarter hour, etc. Preferably, the elements 204 are arranged along a row (or column) in chronological order.

In one embodiment, the first time slot displayed in the radio EPG 200 corresponds to the current time slot (e.g., includes the current time 206). Alternatively, as shown in FIG. 2, the first time slot may correspond to the previous time slot (e.g., the time slot before the one including the current time 206).

The first elements 202, 204 form first and second axes for a grid, within which a plurality of rectangular elements are contained. Each rectangular element may correspond to a radio program 210 for which information is displayed by the radio EPG 200. The radio programs 210 may vary in length, format, and content, as depicted in FIG. 2.

Preferably, a recording indicator 212 is displayed in connection with a radio program 210 that has been scheduled for recording. The recording indicator 212 may be embodied as an icon or the like. Alternatively, a radio program 210 marked for recording may be highlighted or designated by a particular color.

The PDA 124 also includes a wireless digital receiver 214 and a wireless digital transmitter 216. The wireless digital receiver 214 is preferably configured to receive digital transmissions from the cellular transmitters 110 depicted in FIG. 1, in order to receive the program schedule information necessary to display the radio EPG 200. The wireless digital receiver 214 may also be used to receive additional information from the Internet 114, the broadband communication network 101, other users, or other information sources connected to the broadband communication network 101.

Additionally, the PDA 124 may, if desired, include a radio receiver 218 configured to allow the PDA 124 to receive analog transmissions from the radio transmitters 116 and to function as a conventional radio. In alternative embodiments, the wireless radio receiver 218 may be embodied as an add-on device or peripheral coupled to the PDA 124.

The wireless transmitter 216 is preferably configured to transmit digital signals that can be received by the cellular transmitters 110. Thus, when a user presses the "Radio EPG" button 159, an information request can be sent to the broadband communication network 101 via the wireless transmitter 216. The wireless transmitter 216 may also be used for other purposes, such as communicating with other users, sending requests for other information, and the like.

In the depicted embodiment, the PDA 124 also includes a plurality of buttons or similar controls. For instance, the PDA 124 may include a volume control 220 configured to adjust the volume of sound through the speaker 158, the headphone jack 154, or a line out jack 222 configured to convey audio signals to audio components such as home stereos and the like. The PDA 124 may also include an up arrow button 228, a down arrow button 230, a left arrow button 232, a right arrow button 234, and an "OK" button 236, all of which can be used in conjunction to select a radio program 210 from the radio EPG 200 or otherwise interact with information displayed on the screen 156. If desired, the screen 156 may take the form of a touch screen, such that a user can make selections from the radio EPG 200 or another menu simply by touching the desired item with a finger or stylus (not shown).

Additionally, the PDA 124 may have other buttons 238 configured to provide the functions normally associated with a PDA. For example, the other buttons 238 may be configured to operate a calendar system, contact list, "To Do" list, or the like.

Figure 3:
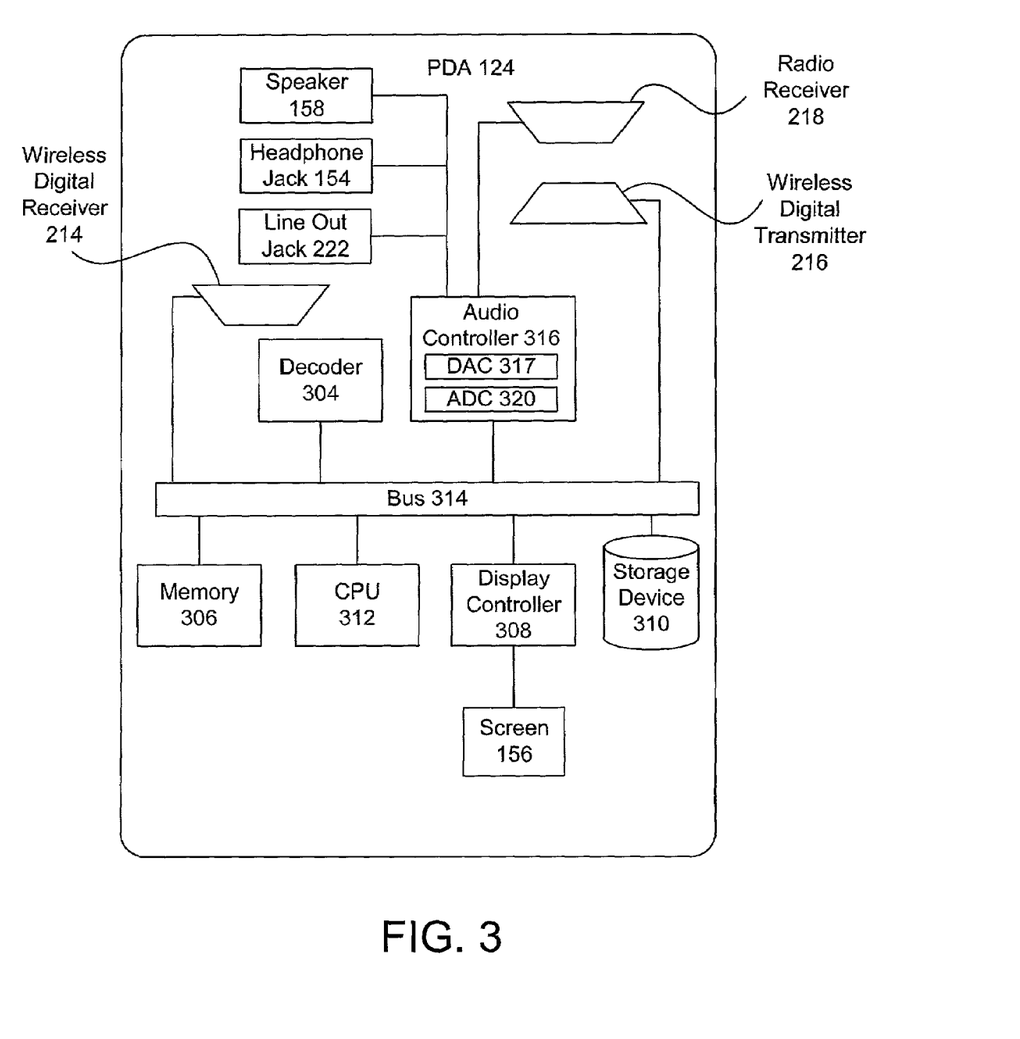
FIG. 3 is a detailed block diagram showing physical components of an exemplary mobile device.

Referring now to FIG. 3, there is shown a physical block diagram of the PDA 124 of FIG. 2 according to one embodiment of the invention. As noted above, the PDA 124 includes a wireless digital receiver 214 for receiving radio program information and other digital information, if desired. In various embodiments, the wireless digital receiver 214 may be configured to receive IR, microwave, VHF, UHF, or other electromagnetic frequencies. Similarly, the wireless digital transmitter 216 may transmit IR, microwave, VHF, UHF, or other electromagnetic frequencies. The radio receiver 218 may be embodied as a standard radio receiver found in conventional radios. One or more antennas (not shown) may be connected to the wireless transmitter 216 and the receivers 214, 218 to enhance the effective range and reliability of the PDA 124.

In one implementation, the PDA 124 also includes a decoder 304, such as an MP3 decoder, for decoding packets received from the network 101. As depicted, the decoder 304 may be implemented as a hardware component. Alternatively, or in addition, software decoding may be used.

The PDA 124 further includes a memory device 306, such as a random access memory (RAM), configured to store data for temporary use. Similarly, a read-only memory (ROM) may be provided for storing more permanent data, such as fixed code and configuration information. The memory device 306 may include a number of components, such as one or more standard DIMM (Dual In-line Memory Module) or SIMM (Single In-line Memory Module) random access memory (RAM) modules, programmable read-only memory (PROM) modules, electrically erasable PROM (EEPROM) modules, static RAM (SRAM) modules, flash RAM modules, and the like.

In one embodiment, a display controller 308 provides a direct, digital video output for a screen 156 equipped to receive the same. Preferably, the display controller 308 includes graphics hardware for performing bit-block transfers (bit-blits) and other graphical operations. Thus, the display controller 308 may be configured to display a user interface (UI) on the screen 156.

In some implementations, the PDA 124 may include a storage device 310, such as a flash RAM module, a compact hard disk drive, or the like. The storage device 310 may be configured to record radio programs and retrieve the radio programs at a later time for decoding by the decoder 304 and/or display by the display controller 308.

The storage device 310 may also be used in various embodiments to store viewer preferences, parental lock settings, electronic program guide (EPG) data, programming preferences, passwords, e-mail messages, contact and calendar information, information requests, and the like. In one implementation, the storage device 310 also stores an operating system (OS) for the PDA 124, such as Windows CE® or Linux®.

A CPU 312 controls the operation of the PDA 124, including the other components thereof, which are coupled to the CPU 312 via a bus 314. The CPU 312 may be embodied as a microprocessor, a microcontroller, a digital signal processor (DSP), application specific integrated circuit (ASIC), field programmable gate array (FPGA), or other device known in the art. As noted above, the CPU 312 may perform various operations based upon the user's operation of the various user controls 159, 220, 228, 230, 232, 234, 236, 238 of the PDA 124.

In selected embodiments, an audio controller 316 is provided for converting between data transferred via the bus 314 and signals that can be received from radio transmitters 116 or sent to audio components. Thus, the audio controller 316 may include a digital-to-analog converter (DAC) 317 for converting digital audio data into a form suitable for the speaker 158, headphone jack 154, and line out jack 222. In alternative embodiments, the audio controller 316 may provide a direct, digital audio output (e.g., AC-3) for a speaker 158 or external component equipped to receive the same. The audio controller 316 may also include an analog-to-digital converter (ADC) 320 configured to convert the analog signals received from a conventional radio broadcast through the radio receiver 218 into digital signals. The digital signals can then be transferred to the various other components 304, 316, 306, 312, 308, 310 connected to the bus 314 for further processing or storage.

In one embodiment, the radio receiver 218 and the audio controller 316 are optional components. The PDA 124 need not provide playback of any audio transmission; if desired, the PDA 124 may simply serve as an information resource for listening to broadcasts through a separate device, such as a home or car stereo.

Of course, FIG. 3 illustrates only one possible configuration of a PDA 124. Those skilled in the art will recognize that various other architectures and components may be provided within the scope of the invention. In addition, various standard components of typical PDA's are not illustrated in order to avoid obscuring aspects of the invention.

Figure 4:
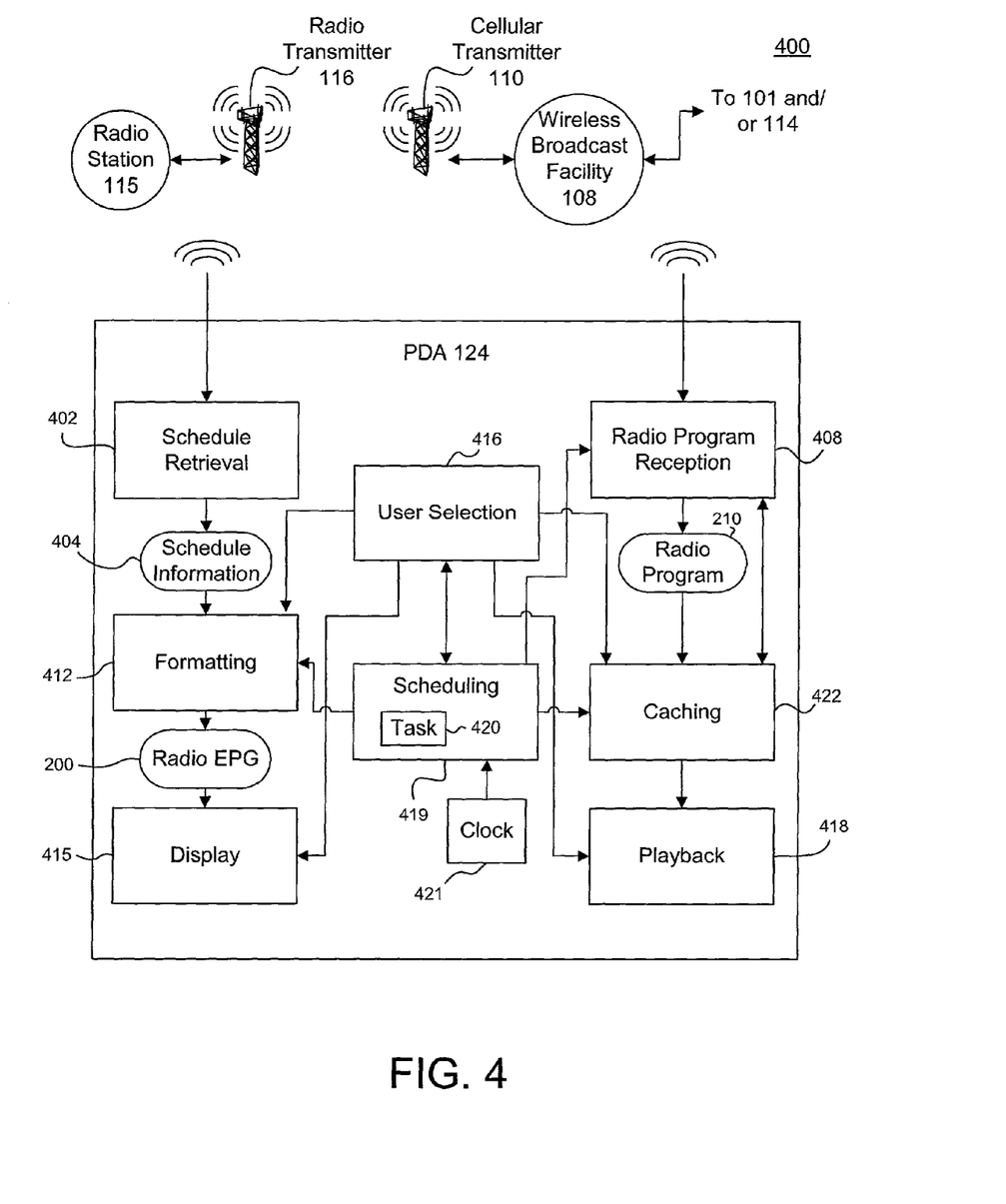
FIG. 4 is a block diagram of logical components of a system for delivering radio programs and related schedule information.

FIG. 4 is a block diagram of logical components of a system 400 for delivering radio programs and related schedule information to the PDA 124. The depicted logical components may be implemented using one or more of the physical components shown in FIG. 3. Additionally, or in the alternative, various logical components may be implemented as software modules stored in the memory 306 and/or storage device 310 and executed by the CPU 312.

In the depicted embodiment, a schedule retrieval component 402 retrieves radio program schedule information 404 from the database 117 shown in FIG. 1. The schedule information 404 may be obtained via the Internet 114, the broadband communication network 101, the wireless broadcast facilities 108, and/or the cellular transmitters 110.

The schedule information 404 may be retrieved upon demand, e.g., when requested by the user, or at periodic intervals. The schedule retrieval component 402 may include a client program for accessing the particular DBMS or server associated with the database 117. In one embodiment, the schedule retrieval component 402 issues a request to the database 117 and receives in response the schedule information 404. In one embodiment, the retrieved schedule information 404 is cached within the memory 306 or the storage device 310 of the PDA 124.

The format of the radio program schedule information 404 is not crucial to the invention. The information 404 may be stored, for instance, within one or more tables of a relational database, within an XML (extensible Markup Language) document, within a delimited text document, or the like.

The schedule retrieval component 402 may only retrieve a subset of the information 404 available in the database 117. For example, the schedule retrieval component 402 may only retrieve the current day's schedule information 404 for the user's favorite radio stations 112, 115 (which may be specified by the user or determined from historical user selections). However, the user may request retrieval of more comprehensive schedule information 404, if desired.

If the PDA 124 is equipped for audio playback, i.e., if the audio controller 316, headphone jack 154, speaker 158, line out jack 222, and/or radio receiver 218 are present, a radio program reception component 408 operates to receive one or more radio programs 210. The radio programs 210 may be received from an Internet-only radio station 112, via the Internet 114, a wireless transmission apparatus 108, and a cellular transmitter 110. In the alternative or in addition, the radio program reception component 408 may receive radio programs 210 from a conventional radio station 115 via the radio transmitters 116. Thus, the term "radio programs" refers to programs transmitted in either analog or digital form, and not just to programs transmitted by radio frequency electromagnetic radiation.

Various software tools are known for receiving digitally-encoded and packetized radio programs 210, one particular example of which is RealPlayer Plus®, available from RealNetworks, Inc. of Seattle, Wash. In alternative embodiments, however, the radio program reception component 408 may be implemented in hardware or firmware.

The schedule retrieval component 402 and the radio program reception component 408 may utilize, for example, the wireless digital transmitter 216 of FIG. 3 to receive a packet stream containing the radio program 210 from a wireless transmission apparatus 108. The radio program 210 may be encoded in a variety of formats, such as MP3, or any other known compressed or uncompressed digital format. The decoder 304 and/or CPU 312 of FIG. 3 decode the transmission, if necessary.

The radio program reception component 408 may be capable of simultaneously receiving a plurality of radio programs 210 from different radio stations 112. The maximum number of radio programs 210 that can be simultaneously received in digital form is primarily limited by the bandwidth of the cellular transmitters 110 and the connection of the wireless broadcast facilities 108 to the Internet 114 or broadband communication network 101. In the case of a broadband communication network 101, the bandwidth is relatively high, allowing for simultaneous retrieval of a large number of radio programs 210.

In one embodiment, a formatting component 412 arranges the raw schedule information 404 into a suitable format for display to the user. As described in greater detail below, the formatting component 412 may arrange the schedule information 404 into an electronic program guide for radio ("radio EPG") 200, an example of which is shown in FIG. 2. In the depicted embodiment, the radio EPG 200 includes a grid with separate axes for radio stations 112, 115 and time slots. Rectangular elements within the radio EPG 200 correspond to individual radio programs 210.

A display component 415 receives the formatted radio EPG 200 from the formatting component 412 and displays the same on the screen 156. In certain embodiments, the display component 415 may be configured to display other information, such as scheduling or contact data, simultaneously with the radio EPG 200, for example, by splitting the screen 156 between the other information and the radio EPG 200.

In one implementation, the radio EPG 200 is interactive in that a user selection component 416 allows a user to select a radio program 210 from the radio EPG 200. As shown in FIG. 2, the user may employ the up, down, left, and right buttons 228, 230, 232, 234 of the PDA 124 to highlight a desired radio program 210, e.g. "News." Thereafter, the user may indicate a selection of the radio program 210 by pressing, for example, the "OK" button 236 on the PDA 124. In the alternative, a stylus, finger, or the like may be used to make the selection if the screen 156 is configured as a touch screen.

In alternative embodiments, a radio program 210 may be selected from a menu or list. In still other embodiments, a user may enter the name of a desired radio program 210, after which the user selection component 416 searches the radio EPG 200 for a matching radio program 210.

In one implementation, the actions performed by the user selection component 416 in response to a selection of a radio program 210 depend on whether the selected radio program 210 (1) is being currently broadcast, (2) will be broadcast in the future, or (3) was previously broadcast by the radio station 112 or 115 (e.g., at an earlier time).

For example, if the user selects a radio program 210 being currently broadcast (e.g. the current time falls within the time slot of the selected radio program 210), the user selection component 416 instructs the radio program reception component 408 to receive the selected radio program 210 from the radio station 112 or 115. Thereafter, the user selection component 416 instructs a playback component 418 to immediately begin playing the radio program 210 as it is received by the radio program reception component 408. In one implementation, the playback component 418 utilizes the audio controller 316 of FIG. 3 to output the radio program 210 to the speaker 158, the headphone jack 154, the line out jack 222, or some combination thereof.

If, however, the user selects a future radio program 210 from the radio EPG 200 (e.g., having a starting time later than the current time), the user selection component 416 instructs a scheduling component 419 to schedule a recording task 420 to record the selected radio program 210 when it is broadcast by the radio station 112. In one embodiment, a recording task 420 includes an indication of the radio station 112 or 115, the starting time, and the ending time for the selected radio program 210.

The user selection component 416 and the scheduling component 419 may receive an indication of the current time of day from a clock 421. The clock 421 may be configured to periodically synchronize itself using timing signals received with radio broadcasts or using time/date servers on the Internet 114.

One or more recording tasks 420 may be stored by the scheduling component 419 within the storage device 310 or the memory 306 of the PDA 124. When the starting time for the selected radio program 210 arrives (as indicated by the clock 421), the scheduling component 419 signals the radio program reception component 408 to receive the radio program 210. Thereafter, a caching component 422 stores the radio program 210 within the storage device 310 or the memory 306 of the PDA 124. Later, the user may listen to the cached radio program 210 by issuing a command with the user controls 220, 228, 230, 232, 234, 236, and 238.

In the alternative to caching within the storage device 310 of the PDA 124, the selected radio program 210 may be cached within the cache 118 of a wireless transmission apparatus 108 or within the cache 119 of the broadband communication network 101. The user may then operate the user controls 220, 228, 230, 232, 234, 236, and 238 to initiate transmission of the recorded radio program 210 via the wireless transmission apparatus 108 and cellular transmitter 110. The PDA 124, or some other listening device, may then receive and play the radio program 210 for the user.

Caching within a wireless transmission apparatus 108 or the broadband communication network 101 is advantageous in that a radio program 210, once cached, is available for download by a plurality of users. Moreover, a cache 118 or 119 accessed by a plurality of users may better anticipate user demand by analyzing the selections of multiple users. Additionally, a centralized cache 118 or 119 is likely to have a larger storage capacity, so that a larger number of radio programs 210 can be stored.

The user may also select a previously-broadcast radio program 210 from the radio EPG 200 (e.g., having an ending time before the current time). Conventionally, a user would be unable to listen to a radio program 210 that he or she failed to record.

However, in accordance with the present invention, the user selection component 416 queries the caching component 422 to determine whether the requested program 210 has been cached. In one implementation, the radio program reception component 408 and the caching component 422 carry out an ongoing program of continuously receiving radio programs 210 from different radio stations 112, 115 without a specific user request. Which radio programs 210 are received may be based upon specified user preferences (e.g., favorite radio stations 112, 115) or observed user selections over time For example, where a user typically listens to broadcasts from a particular radio station 112 or 115, or of a particular genre, the radio program reception component 408 may receive radio programs 210 broadcast by that station 112, 115 or of that genre in anticipation of user demand. In some cases, the caching component 422 may cache all of the programming broadcast by a particular radio station 112 or 115 for a period of time. In one embodiment, the selection of which radio programs 210 are received is made by the caching component 422. Alternatively, the radio program reception component 408 is used for this purpose.

Radio programs 210 received by the radio reception component 408 are preferably cached by the caching component 422, either within the storage device 310 or the memory 306 of the PDA 124. Thus, if the user selects previously-broadcast radio program 210 that was cached, the caching component 422 may retrieve the radio program 210 from the storage device 310 or the memory 306 and provide the same to the playback component 418 for playback to the user. In the alternative, as mentioned above, previously broadcast radio programs 210 may be cached within the cache 118 of the wireless transmission apparatus 108 or the cache 119 of the broadband communication network 101, and retrieved via the wireless transmission apparatus 108 and cellular transmitter 110 for playback.

Of course, not every radio program 210 may be feasibly cached, since the bandwidth of the wireless connection of the PDA 124 is probably not sufficient to simultaneously download all of the possible radio programs 210 from all of the possible radio stations 112 and 115. Thus, if a requested radio program 210 was not cached, the user is notified accordingly. However, by paying close attention to historical user selections, and by relying on stated user preferences, the caching component 422 will typically be able to anticipate a user interest in a majority of radio programs 210 and make them available for subsequent playback.

In one embodiment, the user selection component 416 is in communication with the formatting component 412 and allows the user to change the displayed format of the radio EPG 200. For example, the user may specify the number of rows and columns corresponding to radio stations 112, 115 and time slots. Likewise, the user may specify whether the rows and columns correspond to radio stations 112, 115 and time slots, or vice versa.

Similarly, the user selection component 416 preferably allows the user to scroll the radio EPG 200 horizontally to display, for example, additional radio stations 112, 115, or vertically to display, for example, additional time slots. The scroll function may be controlled by various user controls on the PDA 124, such as the up, down, left, and right arrow buttons 228, 230, 232, 234.

In one embodiment, the user selection component 416 also allows a user to filter the list of radio stations 112, 115 displayed in the radio EPG 200. For example, the user may request that only radio stations 112, 115 from a particular state or locality be displayed. Likewise, the user may request that only radio stations of a particular genre (news, sports, country music, etc.) be displayed.

Figure 5:
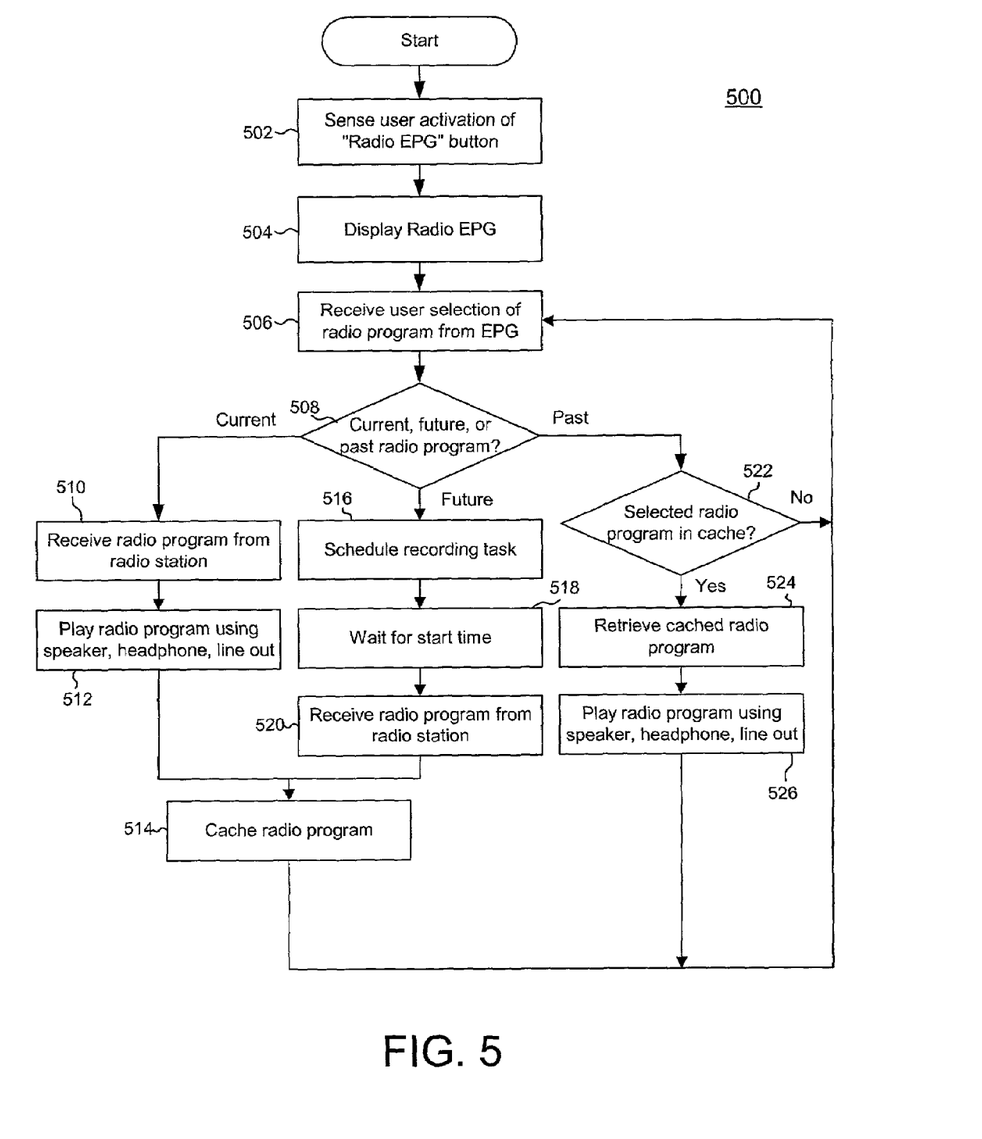
FIG. 5 is a flowchart of a method of delivering radio programs and related schedule information using a mobile device.

Referring now to FIG. 5, there is shown a flowchart of a method 500 for delivering radio programs 210 and related schedule information 404. The method 500 begins by sensing 502 a user's activation of a specifically designated button on a mobile device 120, 122, 124, 126, 128, 130, such as the "Radio EPG" button 159 of the PDA 124. Thereafter, a radio EPG 200 is displayed 504 on the screen 156, as shown in FIG. 2.

A user's selection of a radio program 210 from the radio EPG 200 is then received 506. A determination 508 is made as to whether the selected radio program 210 is being currently broadcast (e.g., the current time is within the time slot of the radio program 210), will be broadcast in the future (e.g., the starting time of the radio program 210 is after the current time), or has already been broadcast (e.g., the ending time of the radio program 210 is before the current time).

If the radio program 210 is being currently broadcast, the method 500 continues by receiving 510 the radio program 210 from the radio station 112 or 115 specified in the radio EPG 200. Thereafter, the radio program 210 is played 512 using the speaker 158, external audio device connected to the PDA 124, or external playback device with an independent wireless connection. In addition, the radio program 210 is preferably cached 514 within the storage device 310 or the memory 306 of the PDA 124. In one embodiment, the receiving 510, playing 512, and caching 514 steps are performed in parallel, such that a user may listen to the radio program 210 as it is being received and stored.

If, however, the radio program 210 is to be broadcast in the future, the method 500 continues by scheduling 516 a recording task 420 to record the radio program 210 when it is actually broadcast by the radio station 112 or 115. The method 500 waits 518 until the start time specified in the recording task 420, at which time the radio program 210 is received 520 and cached 514.

If, however, the selected radio program 210 was previously broadcast, a determination 522 is made whether the selected radio program 210 has been cached by the caching component 422 (either in response to a user selection, a recording task 420, or an ongoing program of caching to anticipate user demand). If so, the cached radio program 210 is retrieved 524 from storage. Thereafter, the radio program 210 is played 526 using the speaker 158, external audio device connected to the PDA 124, or external playback device with an independent wireless connection. After either of steps 514 or 526, the method 500 returns to step 506 to receive another user selection of a radio program 210 from the radio EPG 200.

Based on the foregoing, the present invention offers numerous advantages not available in conventional approaches. For example, the present invention provides a user with a centralized resource of radio program schedule information 404 for a plurality of radio stations 112, 115 and time slots in the form of a radio EPG 200. A user may easily select a radio program 210 from the radio EPG 200 for immediate listening or future recording. Moreover, the user may be able to selectively listen to a previously-broadcast radio program 210 from the radio EPG 200, assuming it was cached by the caching component 422.

Furthermore, a user can obtain the schedule information 404, and in certain embodiments, playback of radio programs 210, from any location within the vicinity of the transmitters 110, 115. Consequently, the user can obtain the schedule information 404 and radio programs 210 in a vehicle, at a friend's house, or at some other location removed from any wired network connection.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

I claim:

1. A method for delivering radio programs and related schedule information using a mobile device, the method comprising:
  retrieving schedule information pertaining to radio programs;
  formatting the schedule information into a program guide comprising first and second axes and a plurality of elements, the first axis corresponding to a plurality of radio stations, the second axis corresponding to a plurality of time slots, each element corresponding to a radio program;
  displaying the program guide on a screen integrated with the mobile device;
  receiving a user selection of an element corresponding to a radio program to be broadcast in the future;
  scheduling a task to receive the selected radio program at a time indicated by the program guide; and
  in response to the selected radio program being received, caching the selected radio program.

2. The method of claim 1, wherein the radio program schedule information is retrieved from a remote database.

3. The method of claim 2, wherein the program schedule information is retrieved by a wireless method.

4. The method of claim 1, wherein the program schedule information is contained in a cellular transmission received by the mobile device.

5. The method of claim 1, wherein the elements of the program guide are irregularly shaped.

6. The method of claim 1, wherein the program guide is displayed on the screen in response to a user activating a specifically-designated button on the mobile device.

7. The method of claim 1, wherein at least one element of the program guide corresponds to a radio program to be broadcast in the future.

8. The method of claim 7, wherein the received radio programs are cached at a location selected from the group consisting of the mobile device, a communication network, and a wireless transmission apparatus connected to the communication network.

9. The method of claim 1, further comprising:
visually indicating within the program guide that a task has been scheduled for receiving the selected radio program.

10. The method of claim 1, further comprising:
playing the cached radio program using the mobile device in response to a user command.

11. The method of claim 10, further comprising:
selectively receiving a plurality of radio programs; and caching the received radio programs.

12. The method of claim 11, wherein the received radio programs are cached at a location selected form the group consisting of the mobile device, a communication network, and a wireless transmission apparatus connected to the communication network.

13. The method of claim 11, wherein the plurality of radio programs is selectively received in response to specified user preferences.

14. The method of claim 11, wherein the plurality of radio programs are selectively received in response to historical user selections.

15. The method of claim 11, wherein the plurality of radio programs comprise all of the programming broadcast by a particular radio station for a period of time.

16. The method of claim 11, further comprising:
receiving a user selection of an element corresponding to a previously-broadcast and cached radio program; and
playing the cached radio program using the mobile device.

17. The method of claim 1, wherein at least one element corresponds to a radio program broadcast at an earlier time.

18. The method of claim 1, wherein at least one element corresponds to a radio program being currently broadcast over the Internet.

19. The method of claim 18, further comprising:
receiving a user selection of an element corresponding to a radio program being currently broadcast;
receiving the radio program via the Internet; and
playing the radio program using the mobile device.

20. The method of claim 1, wherein at least one element corresponds to a radio program being currently broadcast in a wireless analog transmission.

21. The method of claim 20, further comprising:
receiving a user selection of an element corresponding to a radio program being currently broadcast;
receiving the radio program via an analog wireless receiver of the mobile device; and
playing the radio program using the mobile device.

22. A system for delivering radio programs and related schedule information using a mobile device, the system comprising:
a display screen integrated with the mobile device;
a schedule retrieval component configured to retrieve schedule information pertaining to radio programs;
a formatting component, coupled to the schedule retrieval component, configured to format the schedule information into a program guide comprising first and second axes and a plurality of elements, the first axis corresponding to a plurality of radio stations, the second axis corresponding to a plurality of time slots, each element corresponding to a radio program;
a display component, coupled to the formatting component and the display screen, configured to show the program guide on the display screen;
a user selection component configured to receive a user selection of an element corresponding to a radio program to be broadcast in the future;
a scheduling component configured to schedule a task to receive the selected radio program at a time indicated by the program guide;
a radio program reception component configured to receive the selected radio program; and
a caching component configured to cache the selected radio program in response to the selected radio program being received.

23. The system of claim 22, wherein the radio program schedule information is retrieved from a remote database.

24. The system of claim 23, wherein the radio program schedule information is retrieved by a wireless method.

25. The system of claim 24, wherein the radio program schedule information is contained in a cellular transmission received by the mobile device.

26. The system of claim 22, wherein the elements of the program guide are irregularly shaped.

27. The system of claim 22, wherein the program guide is displayed on the display screen in response to a user activating a specifically-designated button on the mobile device.

28. The system of claim 22, wherein at least one element of the program guide corresponds to a radio program to be broadcast in the future.

29. The system of claim 22, wherein the caching component is further configured to cache the selected radio program in a location selected from the group consisting of the mobile device, a communication network, and a wireless transmission apparatus connected to the communication network.

30. The system of claim 22, wherein the formatting component is further configured to visually indicate within the program guide that a task has been scheduled for receiving the selected radio program.

31. The system of claim 22, further comprising:
a playback component configured to play the cached radio program using the mobile device in response to a user command.

32. The system of claim 22, wherein at least one element corresponds to a radio program broadcast at an earlier time.

33. The system of claim 32, further comprising:
a radio program reception component configured to selectively receive a plurality of radio programs; and
a caching component configured to cache the received radio programs.

34. The system of claim 33, wherein the caching component is further configured to cache the selected radio program in a location selected from the group consisting of the mobile device, a communication network, and a wireless transmission apparatus connected to the communication network.

35. The system of claim 33, wherein the plurality of radio programs are selectively received in response to specified user preferences.

36. The system of claim 33, wherein the plurality of radio programs are selectively received in response to historical user selections.

37. The system of claim 33, wherein the plurality of radio programs comprise all of the programming broadcast by a particular radio station for a period of time.

38. The system of claim 33, further comprising:
a user selection component configured to receive a user selection of an element corresponding to a previously-broadcast and cached radio program; and a playback component configured to play the cached radio program using the mobile device.

39. The system of claim 22, wherein at least one element corresponds to a radio program being currently broadcast over the Internet.

40. The system of claim 39, further comprising:
a user selection component configured to receive a user selection of an element corresponding to a radio program being currently broadcast;
a radio program reception component configured to receive the radio program via the Internet; and
a playback component configured to play the radio program using the mobile device.

41. The system of claim 22, wherein at least one element corresponds to a radio program being currently broadcast in a wireless analog transmission.

42. The system of claim 41, further comprising:
a user selection component configured to receive a user selection of an element corresponding to a radio program being currently broadcast;
a radio program reception component configured to receive the radio program via an analog wireless receiver of the mobile device; and
a playback component configured to play the radio program using the mobile device.

43. A mobile device comprising:
a wireless digital receiver configured to receive radio program schedule information;
a formatting component configured to format the radio program schedule information into a program guide comprising first and second axes and a plurality of elements, the first axis corresponding to a plurality of radio stations, the second axis corresponding to a plurality of time slots, each element corresponding to a radio program;
a display screen;
a display component configured to display the program guide on the integrated display screen; and
a storage device configured to cache radio programs for future playback.

44. The mobile device of claim 43, further comprising a wireless digital transmitter configured to transmit a request for the radio program schedule information.

45. The mobile device of claim 43, further comprising an audio controller configured to convert a radio program into a format that can be played on the mobile device.

46. The mobile device of claim 45, wherein the audio controller is configured to provide a signal usable by an audio playback component to a component selected from the group consisting of a speaker, a headphone jack, and a line-out jack.

47. The mobile device of claim 43, further comprising a wireless analog receiver configured to receive a wireless analog transmission.

48. The mobile device of claim 47, further comprising an analog-to-digital converter configured to convert an analog signal from the wireless analog receiver into a digital signal.

49. The mobile device of claim 43, further comprising a specifically designated button configured to activate display of the program guide.

50. The mobile device of claim 43, further comprising user controls configured to enable operation of the mobile device as a car stereo.

51. The mobile device of claim 43, further comprising user controls configured to enable operation of the mobile device as a personal stereo.

52. The mobile device of claim 43, further comprising user controls configured to enable operation of the mobile device as a personal desktop assistant.

53. The mobile device of claim 43, further comprising user controls configured to enable operation of the mobile device as a cellular phone.

54. The mobile device of claim 43, further comprising user controls configured to enable operation of the mobile device as a laptop computer.

55. The mobile device of claim 43, further comprising user controls configured to enable operation of the mobile device as a webpad.

56. A method for delivering radio programs and related schedule information using a mobile device, the method comprising:
retrieving schedule information pertaining to radio programs;
formatting the schedule information into a program guide comprising first and second axes and a plurality of elements, the first axis corresponding to a plurality of radio stations, the second axis corresponding to at least one time slot, each element corresponding to a radio program;
displaying the program guide on a screen integrated with the mobile device; and
caching at least one selected radio program within the mobile device for future playback.

57. A system for delivering radio programs and related schedule information using a mobile device, the system comprising:
means for retrieving schedule information pertaining to radio programs;
means for formatting the schedule information into a program guide comprising first and second axes and a plurality of elements, the first axis corresponding to at least one radio station, the second axis corresponding to a plurality of time slots, each element corresponding to a radio program;
means for displaying the program guide on a screen integrated with the mobile device;
means for receiving a user selection of an element corresponding to a radio program to be broadcast in the future;
means for scheduling a task to receive the selected radio program at a time indicated by the program guide; and
means for caching, in response to the selected radio program being received, the selected radio program.

58. A computer program product comprising computer-readable code for performing a method for delivering radio programs and related schedule information using a mobile device, the method comprising:
retrieving schedule information pertaining to radio programs;
formatting the schedule information into a program guide comprising first and second axes and a plurality of elements, the first axis corresponding to a plurality of radio stations, the second axis corresponding to a plurality of time slots, each element corresponding to a radio program;
displaying the program guide on a screen integrated with the mobile device;
receiving a user selection of an element corresponding to a radio program to be broadcast in the future;
scheduling a task to receive the selected radio program at a time indicated by the program guide; and
in response to the selected radio program being received, caching the radio program.

* * * * *